United States Patent [19]

Hasegawa

[11] Patent Number: 4,809,107
[45] Date of Patent: Feb. 28, 1989

[54] GUIDE MECHANISM FOR A MAGNETIC HEAD POSITIONING DEVICES

[75] Inventor: Tadashi Hasegawa, Fukushima, Japan

[73] Assignee: Mitsubishi Denki Kabushiki Kaisha, Tokyo, Japan

[21] Appl. No.: 129,945

[22] Filed: Dec. 1, 1987

Related U.S. Application Data

[62] Division of Ser. No. 838,731, Mar. 11, 1986, Pat. No. 4,783,708.

[30] Foreign Application Priority Data

Mar. 11, 1985 [JP] Japan .................................. 60-47672
Mar. 25, 1985 [JP] Japan .................................. 60-59754

[51] Int. Cl.$^4$ .......................... G11B 5/55; G11B 21/08
[52] U.S. Cl. ....................................... 360/106; 384/25; 384/26

[58] Field of Search ..................... 360/106; 384/25, 26

[56] References Cited

U.S. PATENT DOCUMENTS 4,428,012  1/1984  Applequist et al. ................ 360/106

Primary Examiner—Robert S. Tupper
Attorney, Agent, or Firm—Sughrue, Mion, Zinn, Macpeak, and Seas

[57] ABSTRACT

A guide mechanism of a positioning device for a magnetic head moving apparatus providing both improved guiding accuracy and reduced manufacturing cost. The mechanism includes a cylindrical bearing, a guide rod passing slidably through the bearing, a movable base, and grip pieces for holding the cylindrical bearing. Preferably, the cylindrical bearing is provided with one or more cylindrical recesses on its inner periphery to space portions of the bearing from the guide rod.

3 Claims, 3 Drawing Sheets

GUIDE MECHANISM FOR A MAGNETIC HEAD POSITIONING DEVICES

This is a division of application Ser. No. 838,731, filed Mar. 11, 1986, now U.S. Pat. No. 4,783,708.

BACKGROUND OF THE INVENTION

The present invention relates to a guide mechanism of a positioning device for a magnetic head moving apparatus.

In flexible ("floppy") disk storage systems in current widespread use, a recording/playback magnetic head must be accurately positioned relative to the center of rotation of the floppy disk in order to ensure compatibility between different floppy disks and floppy disk drives.

FIG. 1 is a top view of a magnetic head positioning apparatus with a conventional guide mechanism, and FIG. 2 is a sectional view taken on a line II—II in FIG. 1. In FIGS. 1 and 2, a magnetic head 1 for recording and playing back data is moved in the radial direction along the surface of a floppy disk 2, the magnetic head 1 being held by a movable base 3 forming a positioning device. The movable base 3 is constructed from engineering plastics by precision injection molding. Two bearings 5a, 5b having excellent slide properties are respectively fitted into holes 4a, 4b in holder devices 3a, 3b installed at opposite ends of the movable base 3. Specifically, bearings of self-lubricating Teflon or oil-impregnated sintered bearings 5a, 5b are press-fitted into the respective holes 4a, 4b, or inserted therein with an adhesive, so that the bearings 5a, 5b are held on and incorporated with the movable base 3.

A guide bar 6 slidably passing through the bearings 5a, 5b constitutes a guide mechanism for the movable base 3. The magnetic head 1 coupled to one face of the movable base 3 is thus moved and positioned as desired by activating a driving motor 7 so as to cause it to rotate through a given displacement angle. Since such a positioning method and an arrangement can be implemented simply using a conventional mechanism, a detailed description thereof will be omitted. Briefly, however, a combination of a threaded shaft 7a and a bearing 3c engaged therewith may be employed. Supporting devices 6a, 6b are used to support the guide bar 6.

In the conventional magnetic head moving apparatus, an extremely high degree of precision is required for the holes 4a, 4b at the two ends of the movable base 3, specifically, for their inner diameter dimension (roundness if they are round holes) and their concentricity (alignment). As forming the movable base 3 completely of metal is costly, engineering plastic materials having a low deformability due to thermal shrinkage are selected to provide an inexpensive movable base 3 using precision injection molding.

However, it is difficult to make the holes 4a, 4b of the holder devices 3a, 3b truly round using ordinary precision injection molding techniques, and hence it is necessary to employ a specially shaped or complicated and expensive die for the injection molding process, or otherwise it is necessary to employ additional machining for correcting the dimensions of the holes 4a, 4b after an ordinary molding operation to attain the required precision of the inner diameter, roundness and concentricity. Consequently, the movable base 3 has been an expensive part.

SUMMARY OF THE INVENTION

The present invention is intended to solve the above-discussed problems, and it is therefore an object of the invention to provide an inexpensive, high-precision guide mechanism.

The guide mechanism according to the present invention is characterized in that a cylindrical bearing extending in the longitudinal direction is held by holder means installed in the longitudinal direction of a movable base and a guide bar passes through the cylindrical bearing, the holder means being grip pieces incorporated with the movable base and used to sandwich and clamp the cylindrical bearing. The cylindrical bearing sandwiched between and clamped by the grip pieces is caused to slide along the guide bar.

The guide mechanism according to a second of the present invention is characterized in that a cylindrical bearing extending in the longitudinal direction is held by at least two holder means installed in the longitudinal direction of a movable positioning device and a guide bar is passed through the cylindrical bearing, an indentation being formed in the cylindrical bearing. The cylindrical bearing held by the holder means is caused to slide along the guide bar. The sliding properties of the bearing are significantly imposed due to the presence of the indentation provided in the cylindrical bearing.

DESCRIPTION OF THE PREFERRED EMBODIMENTS

Figure 1:
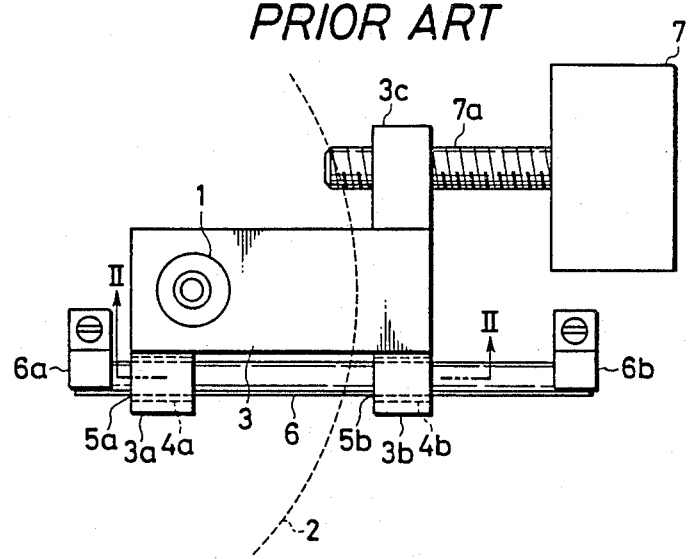
FIG. 1 is top view of a magnetic head moving apparatus with a conventional guide mechanism.
Figure 2:
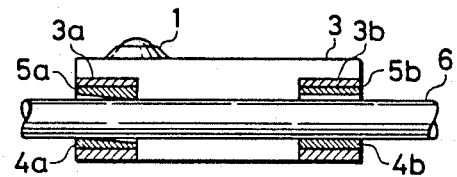
FIG. 2 is a sectional view taken on a line II—II in FIG. 4.

Referring to the accompanying drawings, preferred embodiments of the present invention will be described. Like reference numerals and characters designate like or corresponding elements of the above-described conventional apparatus, and hence a further description thereof will be omitted.

Figure 3:
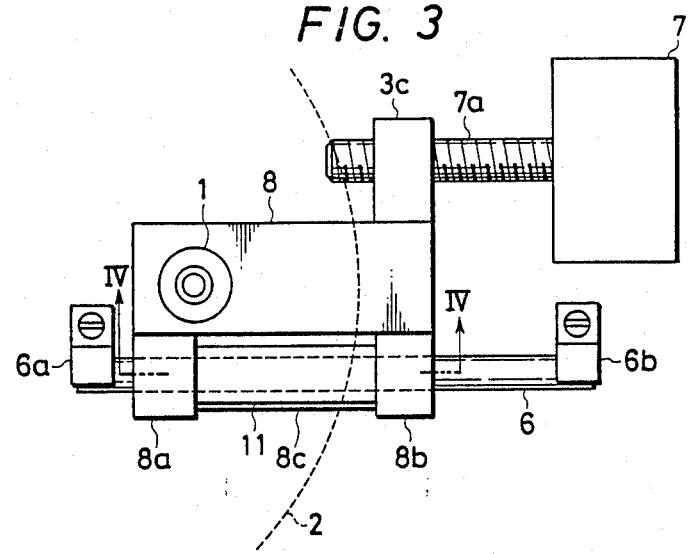
FIG. 3 is a top view of a magnetic head moving apparatus employing a guide mechanism embodying the present invention.
Figure 4:
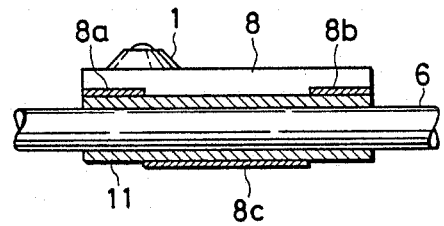
FIG. 4 is a sectional view taken on a line IV—IV in FIG. 1.
Figure 5:
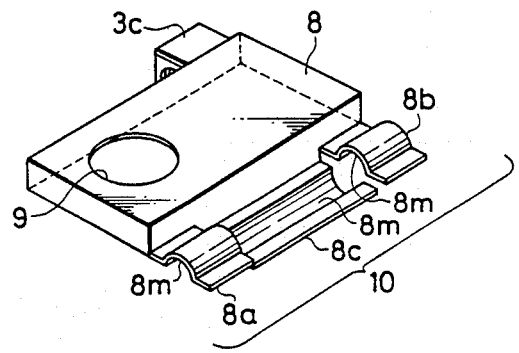
FIG. 5 is an elevational view of the movable base of FIG. 1.

FIG. 3 is a top view of a magnetic head moving apparatus including a guide mechanism embodying the present invention, FIG. 4 is a sectional view taken on a line IV—IV in FIG. 3, and FIG. 5 is an elevational view of the movable base.

In FIGS. 3 through 5, a movable base 8 embodying the present invention is formed with a thin metal sheet formed into a box shape as shown in FIG. 5. The movable base 8 is provided with a magnetic head fitting hole 9 in its upper face and three grip pieces 8a, 8b, 8c whose central portions are bent in a semicircular shape as shown. The grip pieces thus formed are precisely positioned relative to the movable base 8 and are capable of providing the cylindrical bearing 11 with highly precise mounting at a low cost.

The outer periphery of the cylindrical bearing 11 is sandwiched between the grip pieces 8a, 8b, 8c as part of the side of the movable base 8, held by bonding, adhesive, or by press-fitting. The grip pieces 8a, 8b, 8c are about 0.4 mm thick. An oil-impregnated sintered bearing is employed as the cylindrical bearing 11. As the cylindrical bearing 11 has an outer diameter of about 5 mm, a sheet thickness of 0.3 mm and a length of about 40 mm are suitable. In this case, the grip pieces 8a, 8b, 8c exceed the cylindrical bearing 11 in bending strength, compression strength and torsion strength. The precision parts of the cylindrical bearing 11 enhance the guiding properties of the movable base 8 and the guide bar 6. Moreover, the use of an oil-impregnated sintered bearing as the cylindrical bearing 11 provides greater roundness and attains a longer service life than in the conventional case. Consequently, the guide mechanism embodying the present invention is capable of providing an inexpensive magnetic head moving apparatus with precision and with a reliability higher than conventional apparatuses employing engineering plastic materials.

As set force above, the invention is characterized by a cylindrical bearing extending in the longitudinal direction and held by a holder device installed in the longitudinal direction of a movable base, and a guide bar passing through the cylindrical bearing, grip pieces combined with a movable base being employed as the holder means for sandwiching and clamping the cylindrical bearing. Accordingly, an inexpensive high-precision guide mechanism is obtained according to the present invention.

Figure 6:
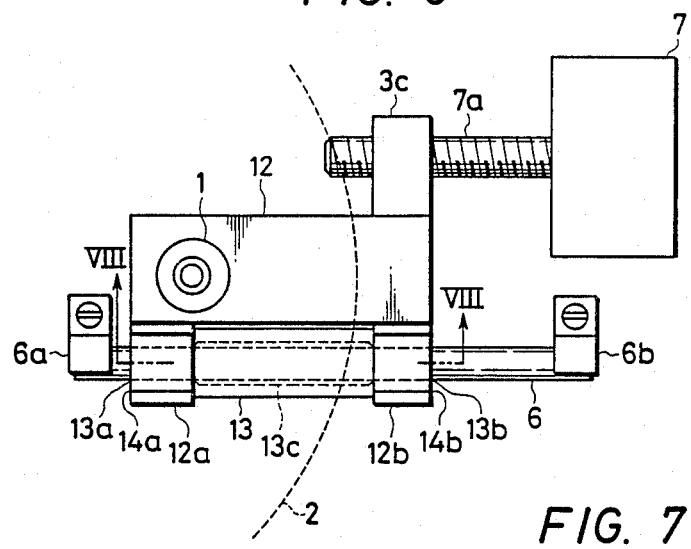
FIG. 6 is a top view of a magnetic head moving apparatus with a guide mechanism constructed according to a second embodiment of the present invention.
Figure 7:
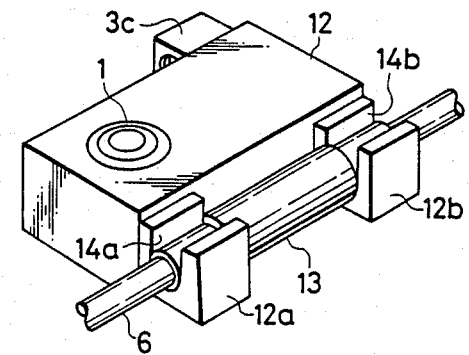
FIG. 7 is a perspective view of essential portions of the apparatus of FIG. 6.
Figure 8:
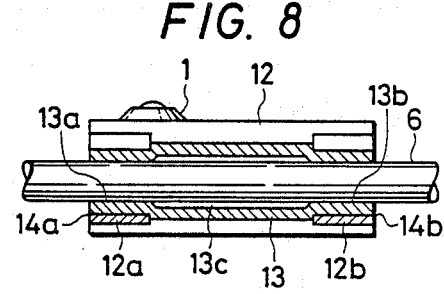
FIG. 8 is a sectional view taken on a line VIII—VIII in FIG. 6.

FIG. 6 is a top view of a magnetic head moving apparatus construction according to a second embodiment of the present invention, FIG. 7 is a perspective view of an essential portion of the same, and FIG. 8 is a sectional view taken on a line VIII—VIII in FIG. 6.

In FIGS. 6 through 8, a movable base 8 embodying the present invention is equipped with U-shaped holder devices 12a, 12b at opposite ends of the movable base 8 spaced in the direction of movement of the base 8. According to this embodiment of the present invention, there is provided a cylindrical bearing 13 adhesion bonded along outer peripheral portions at the opposite ends thereof to the inner peripheries of the holes 14a, 14b of the holder devices 12a, 12b, whereby the cylindrical bearing 13 is fixed to the holder devices 12a, 12b. The cylindrical bearing 13 is an oil-impregnated sintered bearing, the ends of which have a diameter corresponding to the diameter of the guide bar 6 and the holes 14a, 14b of the holder devices 12a, 12b, to thus form faces 13a, 13b making contact with the guide bar 6. An indentation 13c is formed between the faces 13a, 13b, the inner periphery of which is spaced from the guide bar 6.

Since the bearing is a metal cylindrical part, it is easy to ensure, for instance, an inner bearing hole diameter of $4 \pm 0.004$ mm, a roundness off by no more than $\pm 0.004$ mm, on a concentricity off by no more than $\pm 0.005/40$. Accordingly, the movements of the guide bar 6 and the cylindrical bearing 13, namely, the guide bar 6 and the movable base 8, are precisely controlled; that is, their movements are not adversely affected by the rigidity and machining precision of the portions close to the holes 14a, 14b of the movable base 12. Since the areas of the cylindrical bearing 13 in contact with the guide bar 6 are only those located at the opposite ends thereof, the viscosity resistance (which is generally proportional to the contact area of the oil-impregnated sintered bearing) is reduced. Moreover, since the holes 14a, 14b can be somewhat U-shaped, the die for casting the movable base 12 can be simply formed of upper and lower dies. Accordingly, a reduction in the cost of the dies is achieved and their service life improved. Thus, this embodiment of the invention provides an inexpensive precision magnetic head moving apparatus.

Figure 9:
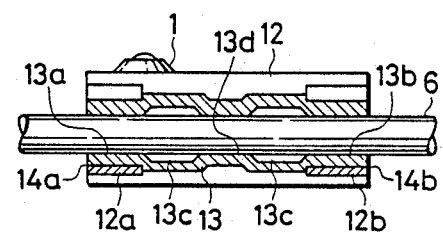
FIG. 9 is a sectional view of a magnetic head moving apparatus according to a third embodiment of the present invention.

FIG. 9 is a sectional view of a third embodiment of the present invention, wherein there is formed a mid-position contact area 13d in addition to those 13a, 13b at the opposed ends of the cylindrical bearing 13 in contact with the guide bar 6. The same effects as in the preceding embodiment are attained, although with a viscosity resistance somewhat greater than in the preceding embodiment.

The second and third embodiments of the invention are thus characterized by a cylindrical bearing extending in the longitudinal direction and held by at least two holder devices installed in the longitudinal direction of a movable positioning device, and a guide bar passing through the cylindrical bearing, an indentation being formed in the cylindrical bearing. An inexpensive high-precision guide mechanism is thus obtained according to the present invention without impairing the sliding properties of the bearing and the guide bar.

I claim:

1. A guide mechanism of a positioning device for a magnetic head moving apparatus, comprising: a cylindrical bearing; a guide rod passing slidably through said bearing, said bearing having at least one cylindrical indentation formed in an inner periphery of a central portion thereof; a movable base; and means for holding said cylindrical bearing to said movable base.

2. The guide mechanism of claim 1, wherein there are provided two of said indentations.

3. The guide mechanism of claim 1, wherein said bearing comprises an oil-impregnated sintered bearing.

* * * * *